| United States Patent [19] | [11] | 4,307,127 |
|---|---|---|
| Shah | [45] | Dec. 22, 1981 |

[54] GASKET HAVING FOAMED SEALANT

[75] Inventor: Kanu G. Shah, Arlington Heights, Ill.

[73] Assignee: Dana Corporation, Toledo, Ohio

[21] Appl. No.: 938,855

[22] Filed: Sep. 1, 1978

[51] Int. Cl.$^3$ .............................................. B05D 1/04
[52] U.S. Cl. .................................... 427/27; 427/185; 427/195; 427/226; 427/244; 428/304.4
[58] Field of Search ................ 427/27, 185, 195, 226, 427/244, 247; 428/313, 310

[56] References Cited

U.S. PATENT DOCUMENTS

| 2,238,681 | 4/1941 | Dorough | 428/313 X |
|---|---|---|---|
| 3,091,551 | 5/1963 | Robertson | 428/313 X |
| 3,164,486 | 1/1965 | Pezzuto et al. | 428/313 |
| 3,410,932 | 11/1968 | Woodson et al. | 428/313 X |
| 3,535,144 | 10/1970 | Gunderman et al. | 427/373 X |
| 3,552,997 | 1/1971 | Powell et al. | 427/373 |
| 3,639,160 | 2/1972 | Nelson | 427/373 X |
| 3,670,699 | 6/1972 | Sargent | 427/27 X |
| 3,765,928 | 10/1973 | Smarook | 156/79 |
| 3,855,028 | 12/1974 | Larson | 428/313 X |
| 3,924,019 | 12/1975 | Jacob | 427/373 X |
| 3,995,554 | 12/1976 | Wells | 427/373 |
| 4,040,993 | 8/1977 | Elbling et al. | 427/27 X |
| 4,042,478 | 8/1977 | Hazan | 204/181 |

*Primary Examiner*—Shrive P. Beck
*Attorney, Agent, or Firm*—Wilson, Fraser, Barker & Clemens

[57] ABSTRACT

A gasket and a process for preparing it are described characterized in that a sealant coating for the gasket is a compressible, resilient, foamed cured resin. The resin, which may be an epoxy, polyester, or polyurethane resin, is comminuted while partially cured, admixed with a blowing agent, and applied, preferably electrostatically, to a base sheet of a gasket. The resin is finally cured while activating the blowing agent to form the compressible, resilient, foamed sealant coating.

11 Claims, No Drawings

GASKET HAVING FOAMED SEALANT

BACKGROUND OF THE INVENTION

Gaskets are often used to provide a fluid type seal between two engaging, confronting or mating parts. A common example includes pipes or similar conduit having machined flanges which are butted together about a gasket, the gasket having a large central opening matching that of the interior of the pipes as well as much smaller peripheral holes registering with like holes in the flanges generally to receive bolts or the like, to secure the assembly together. Gaskets are used for many other like applications, such as for cylinder heads of internal combustion engines, in valves, and the like.

In general, gaskets comprise a base sheet of uniformed thickness which may be sheet metal or of fibrous composition held together by a suitable bonding agent, and a deformable coat or bead which may cover all or only selected areas of the sheet. In use the coat or bead deforms or spreads under pressure of forcing together the parts between which the gasket material lies and aids in realizing the desired fluid-type seal between the parts.

The ability of a gasket to perform its function depends in large part on the ability of the sealant to form a fluid-type seal. In the past, reliance has been almost exclusively on a solid coat or layer of a sealant which permanently deforms or flows under pressure to effect the seal.

SUMMARY OF THE INVENTION

The principal object of the invention is to provide a gasket having a sealant coating that is compressible, resilient, and foamed. The compressible and resilient character of the sealant enables it to effect a fluid-type seal between mating parts without resort to permanently deforming the seal, either by excessive pressure or by frictionally heating the seal to cause plastic flow.

The compressible, resilient seal is formed by foamed resins. Resins useful in the invention are thermosetting, cross-linked resins and preferably include epoxy, polyester, and polyurethane thermosetting, cross-linked resins.

In one form of the invention, the resin is partially cured to a solid state at room temperatures and then ground or comminuted to a finely divided particle form. A blowing agent suitable for use with the resin chosen is admixed with the comminuted resin, and the admixture applied to a base sheet of the gasket, preferably electrostatically as by an electrostatic gun. The resin is then finally cured while the blowing agent is activated to form a sealant coating over the base sheet which has the desired compressible, resilient, and foamed properties. These properties provide a fluid-type seal for the resulting gasket and eliminate the need for permanent deformation or plastic flow of the sealant coating to obtain such a seal.

DESCRIPTION OF THE PREFERRED EMBODIMENTS

In general, a gasket is prepared by forming as a sealant coating on a base sheet a compressible, resilient, foamed, cured resin. The resin is thermosetting in which the thermoset character is preferably achieved by cross-linking. It is important that the resin reach the base sheet in a state short of complete polymerization or cure. Accordingly, the reactants which form the resin can themselves be applied to a base sheet, and cure of the ultimate resin commence and continue to a final state while the reactants are on the sheet. Preferably, however, reactants are first polymerized physically apart from the base sheet to form a polymer or prepolymer that is sufficiently polymerized to be solid at room temperatures but still capable of further polymerization or cure. In this form, the resin is comminuted to a dry powder and admixed with a blowing agent suitable for that resin, the agent also preferably being dry. The admixture is then applied to a base sheet. Finally, the cure of the dry resin powder is advanced to a final stage, usually by heat, which activates as well the blowing agent. This forms the compressible, resilient, foamed sealant coating on the base sheet and results in forming the gasket.

More particularly, the resin is preferably selected from the group consisting of epoxy, polyesters, are polyurethane thermosetting, cross-linked resins. The preparation and curing of these resins involving curing agents and catalysts are well known in the art. In the preferred practice, the resin is polymerized or cured to a stage where it is sufficiently solid at room temperatures to be ground to a powder and yet capable of further polymerization or cure to a final stage. The resin can be suitably comminuted by any known means, such as a ball mill, to finely divided particles which, for example, may have an average particle size of about 5 microns to about 150 microns.

The comminuted particulate resin is next admixed with a blowing agent, preferably from about 01.% to about 6.0% by weight of the admixture. In a preferred practice, the blowing agent is also dry at room temperatures or substantially so, and a substantial amount of the resin particles contain the agent as an integral part, rather than having a simple mixture of resin and blowing agent particles.

More particularly, epoxy resins are preferred, including the three prominent types, namely, the diglycidyl ethers of bisphenol-A resins, novolac epoxy resins, and cycloaliphatic epoxy resins. Of these the first mentioned epoxy resins are preferred. Curing systems for these resins are also known in the art. The resins, for example, can be cured by catalyst-initiated homopolymerization or by copolymerization which includes reacting a hardener with the base resin. The hardener becomes part of the molecule. Curing agents which may be used include aliphatic amines, aromatic amines, Lewis acids like boron trifluoride, and carboxylic acids and their anhydrides.

A curing or hardening agent that is chosen should preferably maintain the dry or substantially dry character of the resin powder to assist in its application in a dry state. Specific curing or hardening agents that may be used include dicyandiamide, pryridine, 2,6 diaminopyridine, 2-ethylhexyl amine, piperidine, ethylamine, methylenedianiline, phthalic anhydride, chlorendic anhydride, maleic anhydride, trimellitic anhydride, azelic acid, sebacic acid, dodecanedioic acid, and the like.

It is understood that conventional fillers, extenders and/or pigments may also be present in the resinous systems, such as silica, alumina, carbon black, mica, clay, and the like. Merely as examples, partially cured epoxy resins may begin to melt and flow at temperatures within the range of about 48° C. to about 66° C. Final cure temperatures may be of the order of about 150° C. to about 180° C. and higher for about 0.5 minute to about 10 minutes.

Polyester resins useful in the invention include those thermosetting, cross-linked polyesters formed by reacting polycarboxlic acids of about 2 carbon atoms to about 6 carbon atoms with diols, such as alkylene diols, having about 2 carbon atoms to about 5 carbon atoms, or with triols. It is possible for saturated linear polyester chains to cross-link, but usually the cross-linking takes place between unsaturated polyester chains in the presence of a cross-linking agent such as styrene, vinyl toluene, methyl acrylate, methyl methacrylate, diallyl phthalate, diacetone acrylamide, divinyl phthalate, and the like.

Specific alkylene glycols that may be used include ethylene glycol, propylene glycol, butylene glycol. diethylene glycol, and hexylene glycol. Optionally, a triol like glycerine can be used at least as part of the reacting alcohol. Specific dicarboxylic acids that may be used include phthalic acid, isophthalic acid, terephthalic acid, succinic acid, sebacic acid, maleic acid, ethylmaleic acid, including anhydrides and mixtures thereof. The proportions and temperatures of reacting the glycol and acid reactants are well known in the art.

In general, a urethane may be considered an ester of carbamic acid, and a polyurethane may be regarded as a polymer of the ester in which the repeating unit is a urethane linkage. One method for the production of the urethane linkage is the reaction of an isocyanate radical with a compound or radical having an active or labile hydrogen atom, such as the hydroxyl and amino radicals. Thus, polyeurethane resins may be generally defined as polymers produced by the addition reaction between organo isocyanates and active hydrogen-containing compounds.

When in such a reaction, an organic diisocyante is used together with a reactant having bi-functional groups, each group having an active hydrogen atom, a polymer is produced having a relatively large molecule. The polymer of these reactants is substantially linear or straight-chained and normally exhibits thermoplasticity or heat sensitivity. These properties are thought to result from a linear polyeurethane, because each of such relatively large straight-chained molecules is not chemically bonded with companion macro-molecules, and therefore the physical relationship of the molecules with respect to each other is not fixed. Freedom of these molecules to move relatively to each other provides the thermoplasticity.

Further, when in such a reaction the organic isocyanate or labile hydrogen containing reactant has more than two functional groups, such as, respectively, in a tri-isocyanate or in glycerol; or if a third bi-functional reactant is included having an active hydrogen atom which has become known in the art as a cross-linker or cross-linking agent; a substantially rigid, apparently thermoset or cured polymer is formed having a three dimensional spatial configuration. Often such a polymer is subjected to a "post-cure" operation which completely reacts all isocyanate groups, although there may be some active hydrogen atoms remaining. These polyurethanes, because of their three dimensional structure and lack of free isocyanate groups (or nearly so) are tougher, more resistant to wear and heat, are less active chemically and have a greater mechanical strength. Such polyurethane resins are those contemplated by the present invention.

Thus, a polyurethane resin useful in the present invention includes those reaction products of an organic polyisocyanate with a variety of other multifunctional compounds that contain a free or labile hydrogen atom. The latter compounds may also be further described as those providing a positive Zerewitinoff test, that is, any compound which, when added to a Grignard solution of methyl iodide, liberates methane by decomposition of the Grignard reagent. Examples of compounds meeting the Zerewitinoff test include those compounds having hydroxyl, carboxyl, amino, and amido groups.

In general, the organic polyisocyanate which may be used in preparing the present polyurethane resins includes diphenylmethane-4 4'-diisocyanate; 3,3'dimethyldiphenylmethane-4,4'-diisocyanate; ethylene diisocyanate; ethylidene diisocyanate; propylene-1,2-diisocyanate; butylene-1,4-diisocyanate; hexylene-1, 6-diisocyanate; cyclohexylene-1,2-diisocyanate; m-phenylene diisocyanate, p-phenylene diisocyanate; 2,4-toluylene diisocyanate; 1,6-toluylene diisocyanate; 3,3'-dimethyl-4,4'-biphenylene diisocyanate; 3,3'-dimethoxy-4,4'-diphenylene diisocyanate; 3,3'-diphenyl-4,4'-biphenylene diisocyanate; 4,4'-biphenylene diisocyanate, 3,3'-dichloro-4,4'-biphenylene diisocyanate; triphenylmethane triisocyanate; 1,5-naphthalene diisocyanate; hexamethylene diisocyanate; and the like.

The compounds most usually reacted with an organic polyisocyanate are the polyesters, such as linear or branched chain polyesters, and/or polyesteramides which contain free hydroxyl groups, and/or polyethers, and/or other groups containing reactive hydrogen atoms such as amino and/or amido groups. Acrylic-modified polyurethane resins may also be used.

Thus, useful polyesters and/or polyesteramides may include those obtained by condensing any polybasic (preferably dibasic carboxylic) organic acid, such as adipic, sebacic, phthalic, isophthalic, terphthalic, oxalic, malonic, succinic, maleic, cyclohexane-1,2-dicarboxylic, cyclohexane-1,4-dicarboxylic, polyacrylic, naphthalene-1,2-dicarboxylic, fumaric, itaconic, glutaric, pimelic, suberic, azelaic, etc., with polyalcohols such as ethylene glycol, diethylene glycol, pentaglycol, glycerol, sorbitol, di(beta-hydroxyethyl) ether, etc., and/or amino-alchols such as ethanolamine, triethanolamine, 3-aminopropanol, 4-aminopropanol, 5-aminopentanol, 6-aminohexanol, 10-aminodecanol, 6-amino-5-methylhexanol,p-hydroxy methylbenzylamine, etc. In the esterification, the acid itself may be used for condensation or the acid halide or anhydride may be used.

The alkylene glycols and polyoxyalkylene glycols useful in the preparation of polyurethane resins useful in the invention may comprise ethylene glycol, propylene glycol, butylene glycol, 2-methylpentanediol, 2-ethylhexanediol, hexamethylene glycol, styrene glycol, decamethylene glycol, diethylene glycol, triethylene glycol, tetraethylene glycol, polyethylene glycols, dipropylene glycol, tripropylene glycol, polypropylene glycols, and the like.

Where a cross-linker is used, as in preparing a three-dimensional cross-link, cured polyurethane resin, this reactant may include polyalcohols, such as butane diol, ethylene glycol, propylene glycol, butylene glycol, diethylene glycol, triethylene glycol, glycerol, trimethylol propane, and the like. Aromatic cross-linkers such as 1,4-di-(hydroxyethyl) benzene and hydroquinone may also be used. Non-tertiary amines because of their active hydrogen atoms can also serve as cross-liners. The polyurethane reaction may be promoted by accelerators or catalysts known in the art, although polyurethanes have been formed without the use of any accelerator.

The manner of preparing a polyurethane as by polyaddition is known in the art. Reference is made, for example, to U.S. Pat. Nos. 2,577,279; 2,620,516; 2,621,166; 2,729,618; and 2,764,565. Such patents are hereby incorporated by reference.

Considering next the blowing or foaming agent, many such agents may be employed in the practice of the invention. Agents can be chosen which chemically react with the resinous system in use to produce a blowing, effluent gas as a by-product. More usually, however, the action of the blowing agent is separate from that of the chemical reaction or further polymerization of the resin, and the blowing agent is present only to convert the resin into a blown, foamed, or cellular state as it finally cures. Accordingly, the blowing agent can be selected primarily for its temperature of activation which generally corresponds to or falls within the temperature range of final cure for the resin.

In this manner, a number of known blowing agents can be used as a source of gas which foams the selected resinous system in place on a base sheet to form the gasket. While materials which volatalize under the heat of resin-cure can be used, it is preferred to employ chemical blowing agents which decompose to yield an expanding volume of gas when heated to within a specific temperature range. Decomposable organic compounds, and especially those which are solid or nearly solid at room temperatures, are preferred for this role. A leading characteristic of a blowing agent is its decomposition temperature which determines the required processing temperature range and the resins with which it can most efficiently be used.

Among the blowing agents useful in the present invention are:

| Blowing Agent | Approximate Operating Temperature Range-°C. |
|---|---|
| 4,4'oxybis (benzenesulfonylhydrazide) | 127°-419° |
| p-toluene sulfonylhydrazide | 105°-132° |
| 1,1'azobisformamide | 160°-232° |
| azodicarbonamide | 160°-232° |
| p-toluenesulfonyl semicarbazide | 193°-235° |
| 5-phenyltetrazole | 232°-288° |
| trihydrazinatriazine | 265°-290° |
| dinitrosopentamethylene-tetramine | 190°-200° |

For example, the first mentioned blowing agent is a white powder and releases mainly nitrogen gas on activation. The agent, p-toluene sulfonylhydrazide, is often used with epoxy resins.

The blowing agent may be incorporated into a selected resinous system by any convenient technique. Dry tumbling is often used. The blowing agent, preferably in dry powder form, is added to the comminuted, partially cured resin and admixed as in drum tumblers. A standard wetting agent in an amount of about 0.05% to about 0.1% by weight of the admixture may be included to coat the resinous particles and cause better adhesion thereto of the blowing agent. Or, as previously indicated, a substantial portion of the resin particles may contain the blowing agent as an integral part. Liquid dispersions can also be used for adding a blowing agent to a resinous system, but in this case the liquid level should be sufficiently low to avoid interference with the manner of applying the resin-blowing agent admixture to a base sheet.

The base sheet may comprise compositions presently used in the art for that purpose. It may comprise, for example, any one of a number of relatively dense sheet materials having a substantially uniform thickness which is deformable so as to conform to the contour of the surfaces over which the sheet is applied. Sheet materials which have been found useful include various fibrous compositions usually containing a fibrous reinforcing or bonding agent. Such fibers may include organic fibers, such as cellulose, or inorganic fibers, such as asbestos, as well as mixtures of the two. The fibrous network can be bonded into an integral sheet by employing a suitable binding agent which can be naturally occurring resinous substances or various synthetic resins and elastomeric materials, such as natural or synthetic rubbers including polysulfide, acrylonitrile-butadiene, polychloroprene, and the like. Small proportions of metallic fibers can also be included in the base sheet. The base sheet may also comprise such structures as a semi-porous fiberboard reinforced with a thermosetting resin, such as a sheet of mineral fibers bonded with cured nitrile rubber or phenolic resin. In gaskets designed for high temperature applications, the base sheet preferably is a metal sheet such as a sheet of steel, aluminum, zinc, alloys of the same, and the like. The base sheet may range in thickness from about 0.002 inch up to about 0.250 inch and preferably from about 0.005 inch to about 0.065 inch, although sizes outside of these ranges can be used.

The resin may be comminuted by any convenient means such as by ball milling. The comminuted resinous particles may be applied to a base sheet by any suitable means, such as dusting, but are preferably applied electrostatically. Electrostatic application of the admixed resin particles and blowing agent may be from an electrostatic fluidizing bed or from an electrostatic gun. A gun is especially used if relatively thin sealant coatings are desired on the base sheet. Electrostatic guns, voltage and current conditions, and related techniques known in the art for this type of application can be used. The electrostatic gun disperses the charged resinous powder as a cloud of particles which are directed by virtue of their charge and the output air pressure of the electrostatic gun toward a grounded substrate. The substrate on which the deposition takes place may be electroconducting such as when the base sheet is a sheet of metal. But the substrate need not be electroconducting. For example, a grounded, electroconducting plate can be placed behind a non-electroconducting substrate so as to attract the charge particles toward and onto such a substrate. Fluidized bed application of comminuted resin particles provides a thicker coating.

After application of the resinous powder-blowing agent admixture to a base sheet, the final cure of the resin and activation of the blowing agent are carried out. This is usually accomplished by heat such as by passing the assembly through an oven. The resin actually passes from a solid to a liquid back to a solid when it thereafter becomes infusible. When the resin particles have fused and become liquid or semi-liquid or otherwise brought to a proper melt viscosity, the blowing agent activates and foams the resin into a compressible, resilient sealant coat on the base sheet. When the resin is finally cured, it is in a foamed or cellular state which it thereafter maintains. The foam is self-adhering to the base sheet and can comprise either a closed-cell or open-cell construction. The thickness of the foam sealant coating on the base sheet may vary depending on the intended use of the gasket. Normally, thickness ranges from about 0.001 inch to about 0.015 inch. An average thickness is about 0.005 inch.

The following examples are intended only to illustrate the invention and should not be construed as imposing limitations on the claims. Percentages are by weight unless otherwise indicated.

EXAMPLE 1

An epoxy powder coating was prepared using the following formulation:

| Compound | Percent |
| --- | --- |
| Diglycidyl ether of bisphenol A epoxy resin having epoxide equivalent weight of 750 | 61.00 |
| Accelerated amine curing agent having amine nitrogen content of 56% (Shell-Epon curing agent) | 3.35 |
| Flow control agent | 2.21 |
| Colloidal silica | 0.30 |
| Titanium Dioxide | 31.0 |
| Phthaloblue Pigment (DuPont BT-297-D) | 2.14 |
| | 100.00 |

The flow control agent may be omitted if desired. When used, it may be any of those available on the market for epoxy resin systems, such as those sold under the trademark "Modaflow" by Monsanto or the trade designation "Hoechst Mowital 30-F". Such agents may also be used in combination.

An amount of eight hundred grams of the above components was charged into a 1.5 gallon jar mill containing 5500 grams of cylindrical high density porcelain grinding media and pulverized to 100 mesh or finer.

A mixture of the above epoxy powder coating and 0.5% of 4,4'oxybis (benzene-sulfonylhydrazide) as a blowing agent was then prepared by blending the mixture 10 to 15 minutes in a Patterson-Kelley twin shell blender.

A Nordson Model Gl-12 electrostatic powder gun applied the mix onto a steel sheet defining a base sheet for the gasket, after which the sheet was heated at about 170° C. for about 2 to 8 minutes. The blowing agent decomposed and foamed the epoxy resin as it cured. This provided a compressible, resilient sealant coat on the resulting gasket.

EXAMPLE 2

An amount of one thousand grams of a diglycidyl ether of bisphenol A resin powder coating, sold under trademark "Polyset 202", and 10 grams of azodicarbonamide blowing agent, sold under the trademark "Kempore 60/40", were blended for 10 to 15 minutes in a Patterson Kelly twin shell blender.

After spraying the assembly the epoxy powder coating-blowing agent mix onto a metal sheet, the assembly was heated between 190° C. and 200° C. for about 5 to 10 minutes. The blowing agent decomposed and foamed an epoxy coating as it cured.

While the examples illustrate the use of epoxy resins, it is understood that polyester and polyurethane resins as described can be similarly used with blowing agents. Surfactants, fillers, extenders, pigments and the like may also be included in the resin-blowing agent mix.

Although the foregoing describes several embodiments of the present invention, it is understood that the invention may be practiced in still other forms within the scope of the following claims.

What I claim is:

1. A process for preparing a gasket having a compressible, resilient sealant coating, comprising:
    (a) comminuting to a particulate form a partially cured dry resin selected from the group consisting of epoxy, polyester, and polyurethane thermosetting resins, said resin being sufficiently cured to be solid and dry at room temperatures but capable of further cure at a temperature within an elevated, predetermined temperature range,
    (b) admixing a blowing amount of a dry blowing agent with said resin particles to form a substantially dry admixture, said blowing agent having a temperature of activation within said elevated, predetermined temperature range,
    (c) electrostatically directing said substantially dry admixture of resin particles and blowing agents toward and onto a base sheet,
    (d) heating the base sheet and applied admixture to a temperature within said predetermined temperature range to further cure the resin of said particles,
    (e) activating substantially all of the blowing agent during said heating step within said predetermined temperature range to foam the resin and form a compressible, resilient, foamed sealant coating on said base sheet, and
    (f) adhering the sealant coating to said base sheet to prepare said gasket, said sealant coating being adapted to effect a fluid-type seal for said gasket without resort to permanent deformation of the sealant coating by excessive pressure or by plastic flow.

2. The process of claim 1 in which said resin is a thermosetting, cross-linked epoxy resin.

3. The process of claim 1 in which said base sheet is a metal sheet.

4. The process of claim 1 in which said comminuted resin has an average particle size of about 5 microns to about 150 microns.

5. The process of claim 1 in which said admixture is applied electrostatically from a fluidized bed.

6. The process of claim 1 in which said admixture is applied electrostatically by an electrostatic gun.

7. The process of claim 1 including curing said resin to a stage in which it is solid at room temperatures, but still capable of further cure, and then comminuting the resin to said dry powder.

8. The process of claim 1 in which said admixture contains from about 0.1% to about 6.0% by weight of said blowing agent.

9. The process of claim 1 in which said resin is a curable, cross-linkable, epoxy resin, and said blowing agent is present in an amount of about 0.1% to about 3% by weight of said resin.

10. The process is claim 9 in which said blowing agent is selected from the group consisting of 1,1'azobisformamide; 4,4'oxybis(benzenesulfonhydrazide); dinitrosopentamethylenetetramine; p-toluene sulfonylhydrazide; p-toluene sulfonyl semicarbazide; azodicarbonamide; 5-phenyltetrazole; and trihydrazinatriazine.

11. The process of claim 1 in which particles of the resin contain the blowing agent as an integral part of said particles.

* * * * *

UNITED STATES PATENT AND TRADEMARK OFFICE
CERTIFICATE OF CORRECTION

PATENT NO. : 4,307,127
DATED : December 22, 1981
INVENTOR(S) : Kanu G. Shah

It is certified that error appears in the above-identified patent and that said Letters Patent are hereby corrected as shown below:

Column 2, line 18, after "polyesters," insert -- and --

Column 2, line 32, change "01.%" to -- 0.1% --

Column 3, line 16, delete the period (.) after "glycol" (third occurrence) and insert a comma (,)

Signed and Sealed this

Twenty-seventh Day of April 1982

[SEAL]

Attest:

GERALD J. MOSSINGHOFF

Attesting Officer

Commissioner of Patents and Trademarks